US010148675B1

(12) United States Patent
Brandwine et al.

(10) Patent No.: US 10,148,675 B1
(45) Date of Patent: Dec. 4, 2018

(54) BLOCK-LEVEL FORENSICS FOR DISTRIBUTED COMPUTING SYSTEMS

(71) Applicant: Amazon Technologies, Inc., Seattle, WA (US)

(72) Inventors: Eric Jason Brandwine, Haymarket, VA (US); Alexander Robin Gordon Lucas, Cheltenham (GB); Robert Eric Fitzgerald, Herndon, VA (US)

(73) Assignee: Amazon Technologies, Inc., Seattle, WA (US)

( * ) Notice: Subject to any disclaimer, the term of this patent is extended or adjusted under 35 U.S.C. 154(b) by 131 days.

(21) Appl. No.: 15/085,585

(22) Filed: Mar. 30, 2016

(51) Int. Cl.
*H04L 29/06* (2006.01)
*H04L 9/32* (2006.01)
*G06F 9/455* (2018.01)

(52) U.S. Cl.
CPC ...... *H04L 63/1416* (2013.01); *G06F 9/45558* (2013.01); *H04L 9/32* (2013.01)

(58) Field of Classification Search
None
See application file for complete search history.

(56) References Cited

U.S. PATENT DOCUMENTS

| | | | |
|---|---|---|---|
| 6,769,066 B1 * | 7/2004 | Botros | G06F 21/55 700/110 |
| 6,971,019 B1 * | 11/2005 | Nachenberg | G06F 21/564 713/187 |
| 7,016,351 B1 | 3/2006 | Farinacci et al. | |
| 7,209,473 B1 | 4/2007 | Mohaban et al. | |
| 7,257,689 B1 | 8/2007 | Baird | |
| 7,616,579 B2 | 11/2009 | Slattery et al. | |
| 7,840,670 B2 | 11/2010 | Hedayat et al. | |
| 8,238,834 B1 | 8/2012 | Bharghavan et al. | |
| 8,307,422 B2 | 11/2012 | Varadhan et al. | |
| 8,443,354 B1 | 5/2013 | Satish et al. | |
| 8,549,641 B2 | 10/2013 | Jakobsson | |
| 8,788,833 B2 | 7/2014 | Fukui | |
| 8,931,107 B1 * | 1/2015 | Brandwine | G06F 11/1451 709/203 |
| 9,032,531 B1 * | 5/2015 | Scorvo | G06F 21/55 726/25 |
| 9,189,627 B1 * | 11/2015 | Islam | G06F 21/566 |
| 9,462,013 B1 * | 10/2016 | Boss | H04L 63/1491 |
| 9,501,345 B1 | 11/2016 | Lietz et al. | |
| 9,521,053 B1 | 12/2016 | Chen et al. | |

(Continued)

OTHER PUBLICATIONS

Arpaci-Dusseau et al. "Log-structured File Systems," Operating Systems Version 0.91, www.ostep.org, 2014, 15 pages.

(Continued)

*Primary Examiner* — Farid Homayounmehr
*Assistant Examiner* — Olanrewaju J. Bucknor
(74) *Attorney, Agent, or Firm* — Davis Wright Tremaine LLP

(57) ABSTRACT

A computing resource service provider may provide customers with a block-level forensics service. Volume images of computing resource associated with customer may be generated and provided to the block-level forensics service. The block-level forensics service or component thereof may generate a volume based at least in part on the volume image and may perform forensics analysis of the volume. A result of the forensic analysis may be provided to the customer.

19 Claims, 7 Drawing Sheets

(56) References Cited

U.S. PATENT DOCUMENTS

| | | | |
|---|---|---|---|
| 9,565,204 | B2 | 2/2017 | Chesla |
| 9,609,399 | B2 | 3/2017 | Krishnamurthy et al. |
| 9,621,516 | B2 | 4/2017 | Basak et al. |
| 9,654,543 | B2 | 5/2017 | Yamashima et al. |
| 2001/0013105 | A1 | 8/2001 | Kang et al. |
| 2003/0084321 | A1 | 5/2003 | Tarquini et al. |
| 2003/0188189 | A1 | 10/2003 | Desai et al. |
| 2003/0204619 | A1 | 10/2003 | Bays |
| 2004/0003290 | A1 | 1/2004 | Malcolm |
| 2004/0049693 | A1 | 3/2004 | Douglas |
| 2004/0064713 | A1* | 4/2004 | Yadav ................... G06F 21/606 713/193 |
| 2004/0243707 | A1 | 12/2004 | Watkinson |
| 2004/0250169 | A1 | 12/2004 | Takemori et al. |
| 2004/0268150 | A1 | 12/2004 | Aaron |
| 2005/0265331 | A1 | 12/2005 | Stolfo |
| 2005/0289649 | A1 | 12/2005 | Mitomo et al. |
| 2006/0010289 | A1 | 1/2006 | Takeuchi et al. |
| 2006/0053490 | A1 | 3/2006 | Herz et al. |
| 2007/0180490 | A1 | 8/2007 | Renzi et al. |
| 2007/0186284 | A1 | 8/2007 | McConnell |
| 2007/0263553 | A1 | 11/2007 | Bharali et al. |
| 2007/0288247 | A1 | 12/2007 | Mackay |
| 2008/0148381 | A1 | 6/2008 | Aaron |
| 2008/0163207 | A1 | 7/2008 | Reumann et al. |
| 2008/0189793 | A1 | 8/2008 | Kirkup et al. |
| 2008/0258880 | A1 | 10/2008 | Smith et al. |
| 2008/0301175 | A1 | 12/2008 | Applebaum et al. |
| 2009/0007100 | A1* | 1/2009 | Field ................... G06F 21/53 718/1 |
| 2009/0070283 | A1 | 3/2009 | Kang et al. |
| 2009/0125573 | A1* | 5/2009 | Hardy ................... G06F 3/0623 |
| 2009/0150998 | A1* | 6/2009 | Adelstein ............. H04L 63/123 726/22 |
| 2009/0249472 | A1 | 10/2009 | Litvin et al. |
| 2010/0031093 | A1 | 2/2010 | Sun et al. |
| 2010/0075751 | A1 | 3/2010 | Garvey et al. |
| 2010/0083382 | A1 | 4/2010 | Farley et al. |
| 2010/0161960 | A1 | 6/2010 | Sadasivan |
| 2011/0060725 | A1 | 3/2011 | Lunde |
| 2011/0072486 | A1 | 3/2011 | Hadar et al. |
| 2011/0138441 | A1 | 6/2011 | Neystadt et al. |
| 2011/0231361 | A1 | 9/2011 | Patchava et al. |
| 2012/0260342 | A1 | 10/2012 | Dube et al. |
| 2013/0024567 | A1 | 1/2013 | Roxburgh et al. |
| 2013/0128751 | A1 | 5/2013 | Keesara et al. |
| 2013/0179574 | A1 | 7/2013 | Calder et al. |
| 2013/0212709 | A1* | 8/2013 | Tucker ................... G06F 21/55 726/29 |
| 2014/0029449 | A1 | 1/2014 | Ku et al. |
| 2014/0173111 | A1 | 6/2014 | Varner |
| 2014/0237599 | A1 | 8/2014 | Gertner et al. |
| 2014/0245423 | A1 | 8/2014 | Lee |
| 2014/0283085 | A1 | 9/2014 | Maestas |
| 2014/0320886 | A1 | 10/2014 | Uchikawa |
| 2014/0331304 | A1 | 11/2014 | Wong |
| 2014/0351810 | A1* | 11/2014 | Pratt ................... G06F 9/45545 718/1 |
| 2015/0043578 | A1 | 2/2015 | Fidler et al. |
| 2015/0081863 | A1 | 3/2015 | Garg et al. |
| 2015/0082039 | A1 | 3/2015 | Stalzer et al. |
| 2015/0143478 | A1 | 5/2015 | Luckett, Jr. et al. |
| 2015/0207813 | A1 | 7/2015 | Reybok et al. |
| 2015/0222656 | A1 | 8/2015 | Haugsnes |
| 2015/0237013 | A1 | 8/2015 | Bansal et al. |
| 2015/0264084 | A1* | 9/2015 | Kashyap ............. H04L 63/1483 726/22 |
| 2015/0288768 | A1 | 10/2015 | Goyal et al. |
| 2015/0355957 | A1 | 12/2015 | Steiner et al. |
| 2015/0381641 | A1 | 12/2015 | Cabrera et al. |
| 2016/0014189 | A1 | 1/2016 | Yamashima et al. |
| 2016/0119365 | A1 | 4/2016 | Barel |
| 2016/0164919 | A1 | 6/2016 | Satish et al. |
| 2016/0191547 | A1 | 6/2016 | Zafar et al. |
| 2016/0283259 | A1 | 9/2016 | Mehta |
| 2016/0306751 | A1 | 10/2016 | Amarendran et al. |
| 2017/0005986 | A1 | 1/2017 | Bansal et al. |
| 2017/0063786 | A1 | 3/2017 | Pettit et al. |
| 2017/0063927 | A1 | 3/2017 | Schultz et al. |
| 2017/0099195 | A1 | 4/2017 | Raney |
| 2017/0109310 | A1 | 4/2017 | Takahashi et al. |
| 2017/0155673 | A1 | 6/2017 | Desai et al. |
| 2017/0171231 | A1* | 6/2017 | Reybok, Jr. ......... H04L 63/1416 |
| 2017/0279847 | A1 | 9/2017 | Dasgupta et al. |
| 2017/0302673 | A1 | 10/2017 | Makhervaks et al. |

OTHER PUBLICATIONS

Rosenblum et al., "The Design and Implementation of a Log-Structured File System," University of California at Berkley, ACM Transactions on Computer Systems vol./Issue 10(1):26-52, Feb. 1992.

Check Point, "Firewall Administration Guide," Version R77, Dec. 6, 2015, found at http://dl3.checkpoint.com/paid/79/7916511f80908c3056af526bae304602/CP_R77_Firewall_AdminGuide.pdf?HashKey=1511120649_66bcd3456845e431d368a251b8d73769&xtn=. pdf., 13 pages.

* cited by examiner

BLOCK-LEVEL FORENSICS FOR DISTRIBUTED COMPUTING SYSTEMS

CROSS REFERENCE TO RELATED APPLICATIONS

This application incorporates by reference for all purposes the full disclosure of co-pending U.S. patent application Ser. No. 15/085,271, filed concurrently herewith, entitled "CORRELATING THREAT INFORMATION ACROSS MULTIPLE LEVELS OF DISTRIBUTED COMPUTING SYSTEMS," co-pending U.S. patent application Ser. No. 15/085,554, filed concurrently herewith, entitled "CORRELATING THREAT INFORMATION ACROSS SOURCES OF DISTRIBUTED COMPUTING SYSTEMS," co-pending U.S. patent application Ser. No. 15/085,608, filed concurrently herewith, entitled "HOST-BASED FIREWALL FOR DISTRIBUTED COMPUTER SYSTEMS," co-pending U.S. patent application Ser. No. 15/085,257, filed concurrently herewith, entitled "SOURCE SPECIFIC NETWORK SCANNING IN A DISTRIBUTED ENVIRONMENT," and co-pending U.S. patent application Ser. No. 15/085,708, filed concurrently herewith, entitled "TRANSPARENT VOLUME BASED INTRUSION DETECTION."

BACKGROUND

A data center is a facility that houses computer systems and various networking, storage, and other related components. Data centers may, for example, provide computing services to businesses and individuals as a remote computing service or provide "software as a service" (e.g., cloud computing). To facilitate the utilization of data center resources, virtualization technologies may allow a single physical computing machine to host one or more instances of virtual machines that appear and operate as independent computer machines to a connected computer user. With virtualization, the single physical computing device can create, maintain, or delete virtual machines in a dynamic manner.

In a large distributed computing system (e.g., multiple distributed data centers) of a computing resource service provider, various customers, users, services, and resources of the computing resource service provider are in frequent communication with each other. Keeping the system secure becomes more challenging as applications are updated and as the complexity and usage of the system increases. In such distributed computing systems, it can be difficult to identify the vulnerabilities of the system. Furthermore, it can also be difficult to isolate and troubleshoot issues with the system, and even when issues are identified, reliably securing the system may be challenging. Additionally, many conventional systems rely upon manual mitigation of such vulnerabilities. The complexity and distribution of computing resources in these environments may make it difficult to collect and analyze log information generated by the computing resources.

BRIEF DESCRIPTION OF THE DRAWINGS

Various techniques will be described with reference to the drawings, in which.

DETAILED DESCRIPTION

Figure 1:
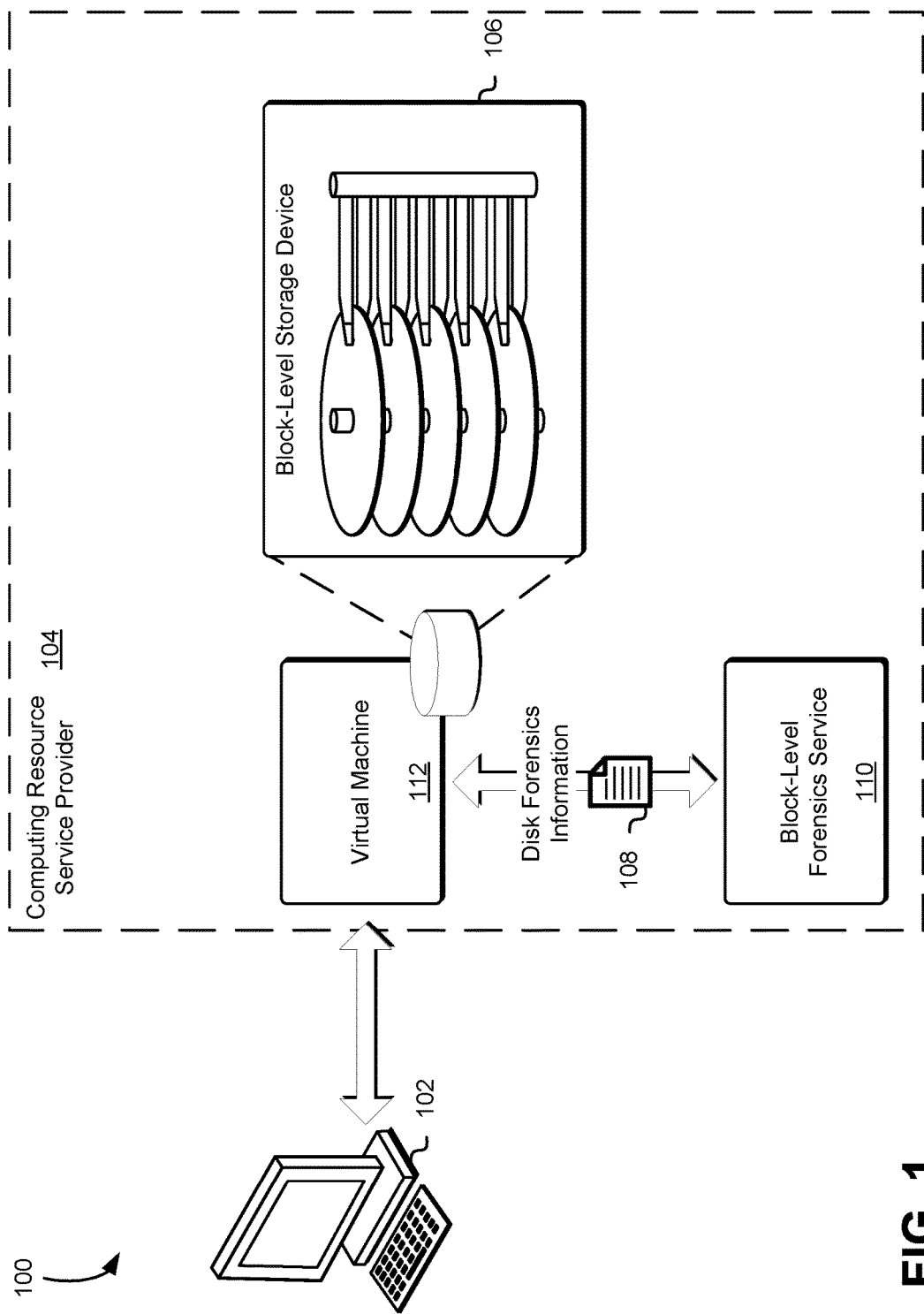
FIG. 1 illustrates an environment in which a block-level forensics service may analyze a volume in accordance with at least one embodiment.

In various examples described below, forensic analysis of various volumes is performed to determine information about the volume including whether the volume (and as a result computing resources utilizing the volume) has been compromised or otherwise subject to an attack. A computing resource service provider may provide computing resources such as virtual machines, remote data storage, networking resources, and a variety of other computing resources to customers. Customers may remotely and programmatically manage these computing resources to cause the resources to implement various applications. For example, a customer using a virtual machine can store data generated by a block-level storage service provided by the computing resource service provider. Furthermore, the customer may generate volume images (e.g., snapshots) which are loaded onto block-level storage devices and used to instantiate virtual machines or other computing resources.

In one example, a customer can request a volume image of a particular volume be created and analyzed by a block-level forensics service. The block-level forensics service may load the volume image onto specific physical hardware (e.g., a server computer system capable of a large number of input output operations per second) and analyze the volume image using several different techniques. In addition, information obtained during the forensic analysis of the customer's volume image may be stored and used to compare results obtained from forensic analysis of other customers' volume images. For example, 100 customers are executing the same versions of a webserver, the block-level forensics service may analyze volume images of the 100 customers' webservers and determine common elements among the volume images. The block-level forensics service uses this information to detect anomalous activity. For example, a customer may report an issue to the computing resource service provider. The block-level forensics service may then analyze the customer's volume image and determine that a particular file of a common operating system on the volume image is different than 99% of that particular file on other customers' volume images. This may indicate that the particular file has been compromised and may be the cause of the issue reported by the customer.

Customer volume images are generated and analyzed by the block-level forensics service. In addition, the block-level forensics service may restrict its analysis to portions of the volume image that have changed since the last volume image was generated. The disk forensic service may analyze and certify that particular volume images are safe and/or free from malware. For example, customers and/or the computing resource service provider can create volume images for use as a base image for instantiating a virtual machine or other computing resources. These base images may be analyzed for malware and other malicious software. In addition, if these base images are found to be free of malware and other malicious software, they may be made available to other customers who may use the base image as is or modify the base image as needed. Furthermore, the modified base images may be analyzed by the block-level forensics service and history and/or life-cycle information for the volume images and/or files on the volume images may be generated. In this manner, changes to the volume images may be traced and correlated with other intrusion detection information. For example, if a customer's virtual machine experiences an error, the block-level forensics service can determine that a library file of an operating system of the virtual machine was modified, and not long before the library file was modified, the virtual machine established a connection with an unknown computer system.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an environment 100 in which a block-level forensics service 110 may analyze a volume in accordance with at least one embodiment. A computing resource service provider 104 may provide computing resources, such as a virtual machine 112, to a customer 102. The computing resource service provider 104 may operate a plurality of data centers including distributed computing resources such as server computer systems described in greater detail below. The server computer systems may be connected to a network, such as the internet or other public network, to communicate with the customer 102. For example, the customer 102 of the computing resource service provider may utilize a network to communicate commands to computing resources of the computing resource service provider 104 causing the computing resources to implement the virtual machine 112 and a virtual network including a public and private subnet. Attackers may attempt to gain access to these computing resources and modify files, steal information, or otherwise interact with or operated the computing resources without authorization.

One such attack involves installing or otherwise loading malware or other malicious executable code onto a computing resource of the customer 102. For example, the customer's 102 virtual machine 112 may include and/or have access to a block-level storage device 106 (e.g., a hard disk drive) containing an operating system and other applications executed by the customer 102 on the virtual machine 112. Attackers may attempt to load malware and other malicious executable code onto a file system of the block-level storage device. The block-level storage device 106 may be configured to store data on platter surfaces in microscopic magnetic regions. Manufacturers of the block-level storage device 106 typically configure the block-level storage device 106 to be treated as a single unit such that the storage capacity of the surfaces is aggregated and made available to a computer system (e.g., the virtual machine 112) as a single unit of storage capacity. As an example, the block-level storage device 106 may have ten surfaces on five platters, each of which is capable of storing 500 GB (gigabytes or $10^9$ bytes) of data. The block-level storage device 106 may be made available to virtual machine 112 as a 5 TB (terabytes or $10^{12}$) disk drive. As may be contemplated, the number of surfaces of a multi-platter disk and the storage capacity of those surfaces described herein are merely illustrative examples and other numbers of surfaces and storage capacities may be considered as within the scope of the present disclosure.

In addition, the manufacturer may include "slack" space on the block-level storage device 106. Slack space may include any unused space in the block-level storage device 106 or other disk cluster. Furthermore, operating systems may also include slack space in files on a block-level storage device 106. For example, DOS® and Windows® file systems use fixed-size clusters. Therefore, even if the actual data being stored requires less storage than the cluster size, an entire cluster is reserved for the file. Specifically, if a partition size of the block-level storage device 106 is 2 GB and the cluster size is 32 KB, a file requiring only 4 KB will have an entire 32 KB cluster allocated by the file system, resulting in 28 KB of slack space. Attackers may load malicious software into this slack space which may be undetectable by the operating system of the virtual machine 112. The block-level forensics service 110 may be configured to, during analysis, search the slack space to determine if the slack space contains malicious software.

In another example, rather than making the 5 TB disk drive described above available as a single 5 TB drive, the block-level storage device 106 may be made available as ten logical drives, each of 500 GB. The block-level storage device 106 may also have each subset of a plurality of subsets of a set of platters of the block-level storage device 106 treated as an independent unit so that, for example, rather than making the 5 TB disk drive described above available as a single 5 TB drive or making the drive available as ten logical drives, each of 500 GB, the drive may be made available as five logical drives, each of 2 GB (each including two surfaces), as four logical drives, each of 2.5 GB (each including three surfaces), or as a number of different sized logical drives (each including different numbers of surfaces). In this manner, the block-level storage device 106 may be utilized by a plurality of virtual machines or other computing devices as described in greater detail below.

Figure 2:
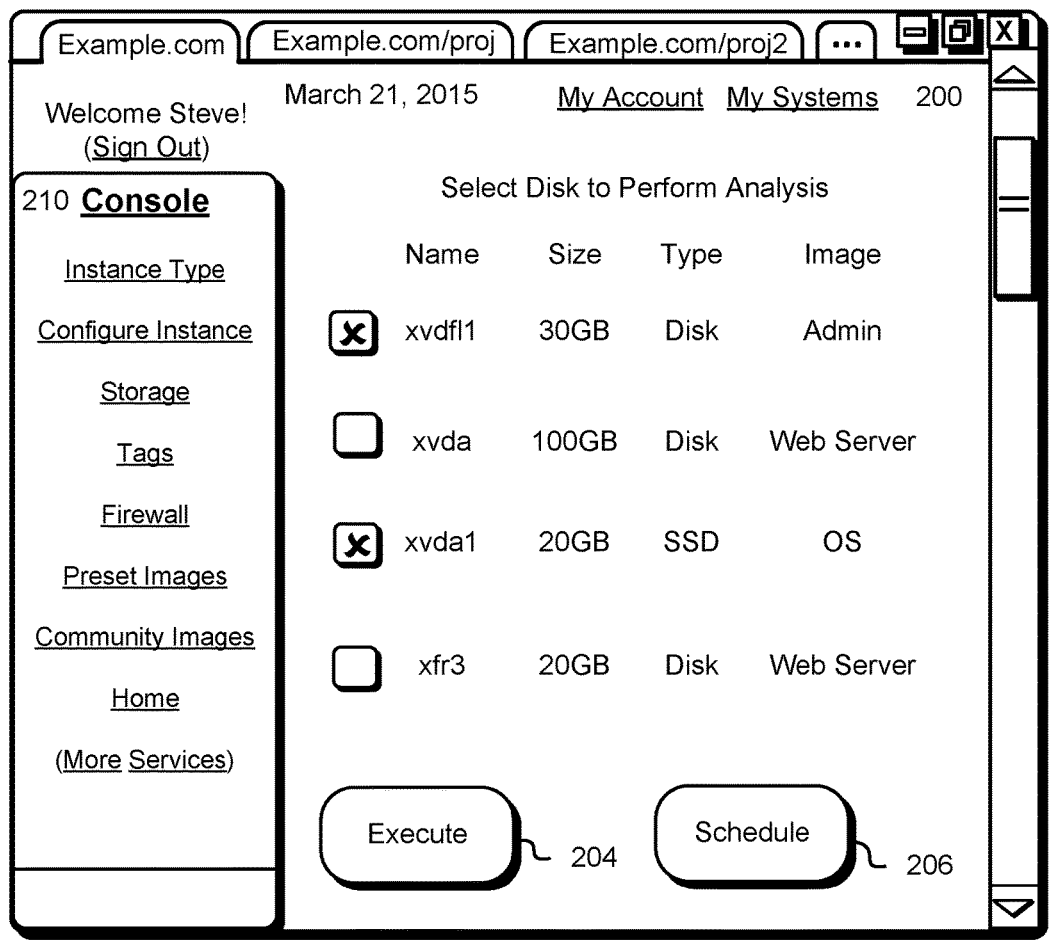
FIG. 2 is a diagram illustrating a management console exposed as a webpage in accordance with at least one embodiment.

Returning to FIG. 1, the customer 102 may request that the block-level forensics service 110 analyze the customer's block-level storage device. However, as described above, in a multi-tenant environment such as the environment 100 including the computing resource service provider 104, the customer 102 may only utilize a portion of the block-level storage device 106. As a result, a snapshot (e.g., volume image described in greater detail below) of the customer's partition of the block-level storage device 106 may be generated. This snapshot may be provided to the block-level forensics service 110. The block-level forensics service 110 may then analyze the snapshot and return disk forensics information 108 to the customer. Although as illustrated in FIG. 2, the disk forensics information 108 is provided to the customer 102 through the virtual machines 112, other mechanisms for providing the disk forensics information 108 to the customer 102 may be used in accordance with the present disclosure, such as the management console described in greater detail below in connection with FIG. 2.

The disk forensics information 108 may include evidence or other information obtained from computing resources and digital storage media such as the block-level storage device 106. The block-level forensics service 110 may be configured to, in a forensically sound manner, analyze volume images to identify, preserve, recover, and present information about the volume images. In various embodiments, evidence is obtained from the block-level forensics service 110 and subjected to the same guidelines and practices imposed by various legal jurisdictions. The block-level forensics service 110 may utilize a variety of different disk forensics tools to analyze volume images. Disk forensic tools may include a variety of commercial and open source software packages and/or applications such as Autopsy, Bulk Extractor, gfzip, hasdb, Scalpel, Sleuthkit, Nuix Desktop®, and WindowsSCOPE®.

The volume images utilized by the block-level forensics service 110 may include computer files containing the contents and structure of a disk volume or an entire data storage device, such as a hard disk drive, tape drive, floppy disk, optical disc or other storage devices. The volume images may be generated by creating a sector-by-sector copy of the source medium, thereby replicating the structure and contents of the storage device independent of the file system. Depending on the volume image format, a volume image may span one or more computer files. Volume image file formats may be open standards, such as the ISO image format for optical disc images, or proprietary to particular software applications. The volume image may include the entire partition allotted to the customer 102 or may include only a portion of the entire partition allotted to the customer 102. For example, known files such as the operating system may be omitted from the volume image.

Upon obtaining the volume image the block-level forensics service 110 may analyze the volume image to generate the disk forensics information 108 by at least recreating the volume from the volume image (e.g., loading the volume image onto a storage device). For example, the block-level forensics service 110 can obtain timing and life-cycle information from the file system stored in the volume image. The block-level forensics service 110 may also track file frequency across customers and generate a histogram of file frequency for particular files. The histogram may provide an indication as to what file in the volume may contain malicious software. For example, if a particular file is located in 99% of customer volumes this may be an indication that the file does not contain malicious code. In another example, if a particular file in a boot volume in a customer is unique to the customer this may indicate malicious activity.

Returning to the example above, files on the volume may have multiple time stamps associated with the files. These time stamps may be included as metadata associated with the file referred to as MAC times ("Modified Access Change"). The MAC times may indicate a particular time where the file was accessed, file contents were modified, or the metadata associated with the file was altered. This information may be extracted by the block-level forensics service 110 during analysis of the volume image and combined information obtained from an intrusion detection system, a logging system, or other system suitable for monitoring the operations of computing resources. For example, time stamps of events within the file system are correlated with time stamps of network activity, process activity, or other activities recorded by the intrusion detection system.

The block-level forensics service 110 may also generate a list of files or other data objects on a volume, or volume image thereof, that may be ignored. This may enable the disk forensic service 110 to be more efficient in responses to the customer 102. For example, the customer 102 may transmit a request to the block-level forensics service 110 to analyze a volume image of the virtual machine 112. The block-level forensics service 110 can then determine that there are 100,000 files on the volume image of which 80,000 files came from a parent volume image (e.g., volume image from which the volume image of the virtual machine 112 was modified as described above) that has previously been verified and therefore may be ignored. In addition, the block-level forensics service 110 may determine information associated with the 20,000 files that were modified, such as when the files were modified or the version of a volume image in which the files were modified. For example, the customer 102 may use a standard volume image and modify it for use with the virtual machines 112. The customer 102 or another customer may then modify the volume image for use as a webserver. The block-level forensics service 110 may analyze each volume image and determine from which modification each of the files on the volume image originated. Files or other data objects flagged as malware or malicious code by the block-level forensics service 110 may then be tracked across customers and computing resources.

The block-level forensics service 110 may also mount volume images as read only to avoid inadvertently modifying the volume corresponding to a volume image. A public key or other cryptographically verified information may be applied to the disk forensics information 110 to verify the identity and authenticity of the data. In addition, the customer's 102 volume image may be encrypted and the block-level forensics service 110 may require access to the encryption key to perform the analysis. The encryption key may be maintained in a security module or security service (not illustrated in FIG. 1 for simplicity) of the computing resource service provider 104. In these embodiments, the block-level forensics service 110 gains access to the key by obtaining credential information from the customer 102 and may also obtain key identification information if necessary. Alternatively, the customer 102 may maintain the key and provide the block-level forensics service 110 with the key.

As used herein, the term "platter" may refer to a physical medium, typically disk shaped, upon which data may be stored using a magnetic medium. Data may be stored on the platter by changing one or more magnetic characteristics of portions of the medium. A multi-platter disk may include a disk with a single platter where such a disk has two usable surfaces (i.e., a top surface and a bottom surface). Also as used herein, a "usable surface" of a platter is a platter upon which data may be stored as described herein. For example, in a hard disk drive, the top surface of the top platter and/or the bottom surface of the bottom platter may not be usable surfaces because there may be no read/write heads for these surfaces due to geometry constraints. In such an example, the top surface of the top platter and the bottom surface of the bottom platter may not be usable surfaces.

Data may be retrieved from the surface (e.g., may be read from the surface) and/or may be stored on the surface (e.g., may be written to the surface) as a result of an access request (which may also be referred to herein as an "input-output (I/O) request"). An access request may specify a logical unit number or other logical address that may correspond to one or more surfaces associated with the access request. The access request (or input-output request) may be fulfilled by the multi-platter disk by providing access to the surface or surfaces corresponding to the logical unit number or other logical address of the access request for reading and/or writing data to the corresponding surface or surfaces.

An access request to read and/or write data to the surface (or surfaces) may be received by the multi-platter disk. Based on the logical address associated with the access request, the data may be retrieved (or read) from the surface or surfaces and/or may be stored on (or written to) the surface or surfaces that correspond to the logical address specified by the access request. Similarly, an access request to read data from the surface may be received by the multi-platter disk and such an access request may also have a logical unit number or other logical address associated with the access request. The data may then be read from the surface corresponding to the surface or surfaces corresponding to the logical address associated with the access request. A logical unit address may, for example, be a logical unit number of a small computer system interface protocol. The access request may be based on a user-specified logical address protocol or user-defined logical address protocol that may be based on, for example, the surface number, the platter number, the disk number, or some other criteria.

A user-specified logical address protocol (or user-defined logical address protocol) is a custom protocol that may be used to determine the surface or surfaces associated with an access request. For example, a multi-platter disk may have six surfaces and a user may first specify (using, for example, a user interface or an application programming interface request) that surface one may correspond to a first logical address, that surfaces two and three may correspond to a second logical address, and that surfaces four, five, and six correspond to a third logical address. Such a user-specified logical address protocol allows for access requests using any of the three logical addresses and, by using the correct logical address, each of the sets of surfaces may be treated as an independent unit. The user may select a different user-specified logical address protocol (or user-defined logical address protocol) that may, for example, treat each platter (or each surface) as an independent unit using a user interface and/or an application programming interface request.

FIG. 2 shows a webpage 200 which may be displayed by an application executed by a computing system enabling a customer to interact with a block-level forensics service operated by the computing resource service provider. As illustrated in FIG. 2, the webpage 200 includes various graphical user interface elements that enable customers to select one or more volume images associated with computing resources to perform forensics analysis through a management console of which the webpage 200 is a part. In various embodiments, the customer interacts with the block-level forensics service by issuing commands through the management console. The webpage 200 may be displayed by various applications, such as a mobile application or web browser. In this example, the webpage 200 includes various navigational features. For instance, on the left-hand side of the webpage 200, various links 210 may link to one or more other webpages that contain additional content corresponding to a variety of different actions the customer may cause to be performed.

The console pages may correspond to operations that may be taken to manage or otherwise control the block-level forensics service or other computing services of the computing resource service provider. In this example, the links appear as textual words which enable the links to be selected using an appropriate input device such as a keyboard, mouse, touchscreen or other input device. Selection of one of the links 210 may cause an application displaying the webpage 200 to submit, pursuant to a Uniform Resource Locator (URL) associated with the selected link by the programming of the webpage 200, a Hypertext Transfer Protocol (HTTP) request for the content associated with the link to a server that provided the webpage 200 or another server.

In this example, the webpage 200 also includes a graphical customer element configured as a "execute" button 204. The execute button 204 may be a graphical user interface element of the webpage 200 where the underlying code of the webpage 200 is configured such that selection by an input device of the execute button 204 causes information corresponding to the selection of a particular volume image selected on the webpage 200 to be transmitted to the security service or other service of the computing resource service provider. For example, selecting the execute button 204 may cause a block-level forensics service to receive the customer's selection of volume images and, as a result, may cause the block-level forensics service to begin to perform forensic analysis of the volume images corresponding to the customer's selection.

Furthermore, through the management console, the customer may be guided through the process of selecting particular volume images to be analyzed by the block-level forensics service. For example, the customer may be prompted to select volume images that have not yet been analyzed by the block-level forensics service. In addition, the customer may limit or select particular portions volume images to be analyzed by the forensics service. For example, the customer may request that the block-level forensics service only analyze changes to the volume image performed after a particular date and time. The process may be divided into steps and the customer may be prompted to provide information at each step. For example, the webpage 200 displays to the customer a list of different types of computing systems with associated volume images. The customer, using an input device, may select a set of computing systems to provide the block-level forensics service with volume images of for analysis. The customer selection may be stored until the entire process is completed or the customer selection may be transmitted to the block-level forensics service upon selection of a graphical user interface element.

As illustrated in FIG. 2, the webpage 200 may contain a graphical user interface element configured as icons displaying information associated with the computing resources operated by the customer that may contain and/or have associated with it one or more volume images. The icons may correspond to a particular computing resource utilized and/or available to the customer. The webpage 200 may also include a graphical customer element configured as a "schedule" button 206. The schedule button 206 may be a graphical user interface element of the webpage 200 where the underlying code of the webpage 200 causes the application displaying the webpage 200 to display additional information (not shown in FIG. 2 for simplicity) that enables the customer to schedule block-level forensic operations for selected volumes. For example, the customer may schedule forensic analysis of one or more logical volumes to be performed periodically or aperiodically by the block-level forensics service. In addition, the customer, computing resource service provider, or other entity may determine a schedule for a particular logical volume. The schedule may include various event driven triggers. For example, when a customer creates a new boot volume or new version of an existing boot volume, this event may be scheduled to trigger forensic analysis.

Once the customer has made a selection using the webpage 200 and selected the execute button 204, the application displaying the webpage 200 may submit an HTTP request to the block-level forensics service to request the volume images for the computing resources included in the selection. The request may be transmitted to one or more services of the computing resource service provider. Furthermore, the block-level forensics service may obtain additional information from one or more other services in order to complete the request from the customer. For example, the block-level forensics service may obtain credentials from a policy service to access the computing resources. In various embodiments, the block-level forensics service or other service of the computing resource service provider returns, in response to the HTTP request from the customer, identification information configured to identify disk forensics information provided in response to the customer's HTTP request such that the customer may obtain any disk forensics information based at least in part on the identification information.

In one example, the customer may select volume images for inclusion in a marketplace of volume images. The selection by the customer may cause the block-level forensics service to execute a preliminary analysis of the volume image prior to inclusion in the market place. This may ensure that the volume image is free of any malware or malicious code known to the block-level forensics service.

Figure 3:
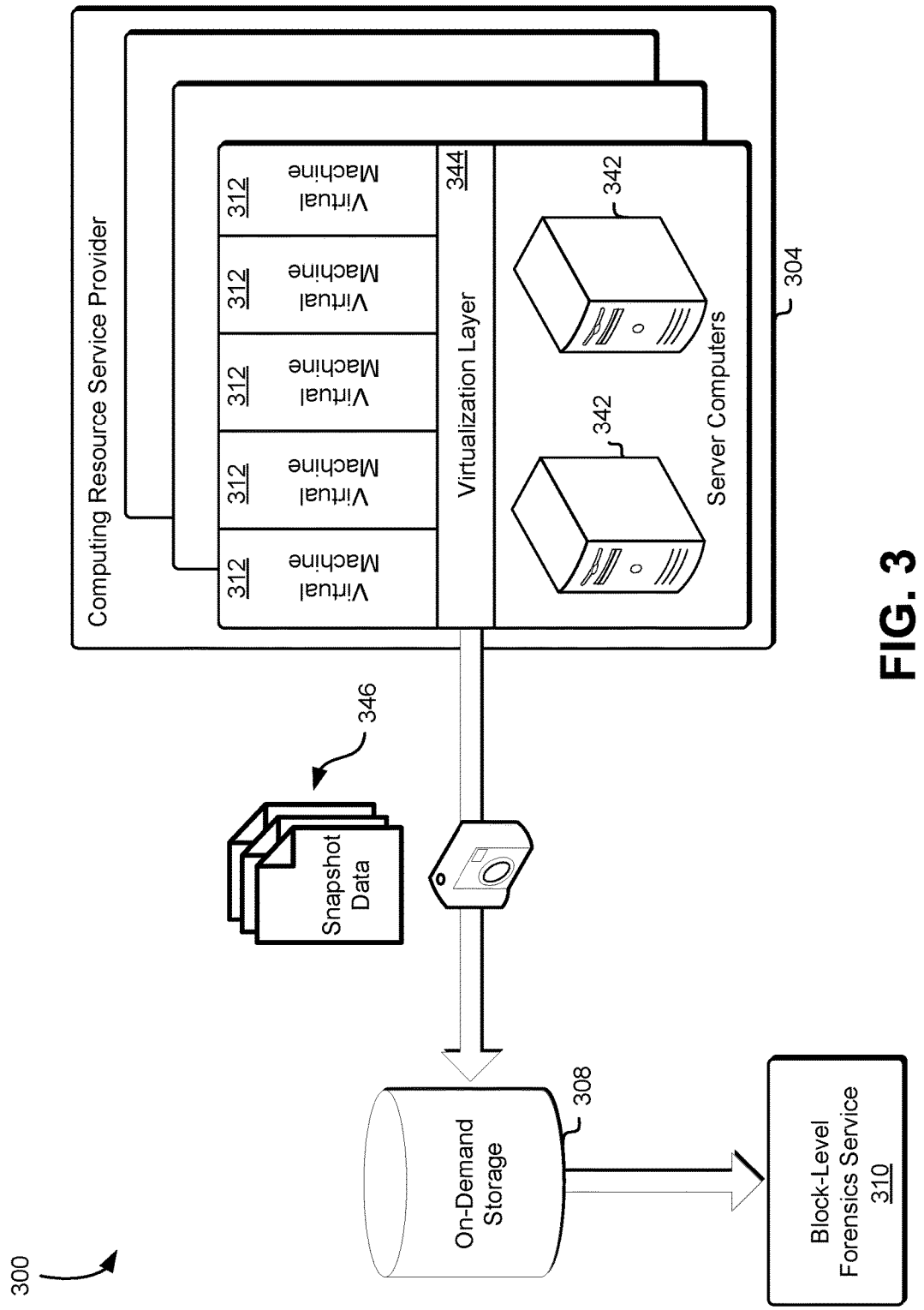
FIG. 3 illustrates an environment in which a block-level forensics service may analyze a volume in accordance with at least one embodiment.

FIG. 3 illustrates an environment 300 in which a block-level forensics service 310 of a computing resource service provider 304 may obtain snapshot data 346 in accordance with at least one embodiment. The block-level forensics service 310, which may be implemented by physical hardware, is used by the computing resource service provider 304 to provide disk forensics information to customers and/or other services of the computing resource service provider 304. The block-level forensics service 310 may include a group of computing systems, such as the server computers 342 described in detail below, configured to generate disk forensics information based at least in part on snapshot data 346 obtained from customers or other services of the computing resource service provider 304. The physical hardware may include a server computer 342. The server computer 342 may be any device or equipment configured to execute instructions for performing data computation, manipulation, or storage tasks, such as a computer or a server. A server computer 342 may be equipped with any needed processing capability including one or more processors, such as a central processing unit (CPU), a graphics processing unit (GPU) or a digital signal processor (DSP), memory, including static and dynamic memory, buses and input and output ports that are compliant with any handshaking, communications, or data transfer protocol. The physical hardware may also include storage devices, such as block-level storage devices, storage disks and tapes, networking equipment, and the like.

A virtualization layer 344 may include a bare metal hypervisor or a hosted hypervisor. The virtualization layer 344 executing on the server computer 342 enables the physical hardware to be used to provide computational resources upon which one or more virtual machines 312 or other computing resources may operate. For example, the virtualization layer 344 enables a particular virtual machine 312 to access physical hardware on the server computer 342 through virtual device drivers or other executable code on the virtual machine 312. The virtualization layer 344 may include a hypervisor or virtualization software and/or hardware. The virtualization layer 344 may also include an instance of an operating system dedicated to administering the virtual machine 312 or other computing resource executing on the server computer 342. Each virtualization layer 344 may include its own networking software stack, responsible for communication with other virtualization layers 344 and, at least in some embodiments, also responsible for implementing network connectivity between the virtual machine 312 or other computing resources executing on the server computer 342 and virtual machine 312 or computing resources executing on other server computers 342.

Furthermore, the server computer 342 may host multiple virtualization layers 344 of the same or different types on the same server computer 342 as well as virtual machine 312 of the same or different types. For example, a server computer 342 may host a first virtual machine 312 instantiated from a first volume image and operated by a first customer and may host a second virtual machine 312 instantiated from a second volume image that is operated by a second customer. The virtualization layer 344 may be any device, software, or firmware used for providing a virtual computing platform and/or virtualized computing resources for the virtual machine 312 and/or component thereof. The virtual computing platform may include various virtual computer components, such as one or more virtual CPUs, virtual memory, virtual disk storage, and the like. The virtual machine 312 may be provided to the customers or other service of the service provider 304 and the customers may utilize the virtual machine 312 or components thereof. Further, the computing resource service provider 304 may use one or more of its own virtual machines 312 for supporting execution of its applications and providing computing resources for such applications.

Commands and other information may be included in an application program interface (API) call from the block-level forensics service 310 or an on-demand storage service 308, described in greater detail below, to the virtualization layer 344. The block-level forensics service 310 enables the customers and other services of the computing resource service provider 304 to manage and operate analysis of various snapshot data 346 generated based at least in part on virtual machines 312 or other computing resources. For example, the client may transmit a request to the block-level forensics service 310 for disk forensics information corresponding to a virtual machine 312 based at least in part on an analysis of snapshot data 346 corresponding to the virtual machine 312.

The request may be an API call including information corresponding to the customer, the on-demand storage service 308, or the particular virtual machine 312. The block-level forensics service 310 may determine the corresponding virtualization layer 344 for the virtual machine 312 included in the request and transmit a command to the virtualization layer 344 to obtain snapshot data 346 corresponding to the virtual machine 312 and store the snapshot data 346 in the on-demand storage service 308. Alternatively, the virtualization layer 344 may be configured to, at the expiration of an interval of time, generate snapshot data 346 of the virtual machine 312. The snapshot data 346 may be point-in time consistent. This may require that all writes to the disk are queued until a complete copy of the virtual machine 312 may be generated.

Queuing the writes may cause the writes to disk to be deferred or otherwise stalled until generation of the snapshot is completed. Furthermore, the snapshot data 346 may include modification to the logical volume and/or virtual machine. For example, a customer, since the last volume image was generated, may have modified only a portion of the logical volume (e.g., 4 blocks of the logical volume), virtualization layer 344 or other component of the computing resource service provider 304 may determine the portion of the logical volume and generate snapshot data 346 based at least in part on the portion of the logical volume that has been modified. This may reduce an amount of data that must be obtained to generate the snapshot data 346 and may enable the block-level forensics service 310 to determine a time-line or history of modifications to the logical volume and/or virtual machine 312. For example, the block-level forensics service 310 may use the time-line information to determine in what version of a logical volume (e.g., boot volume) a particular file was modified that may be associated with malicious activity.

In yet other embodiments, a separate process (not shown in FIG. 3 for simplicity) is used to generate snapshot data 346 corresponding to the virtual machines 312 or other computing resources. In these embodiments, the separate process generates the snapshot data 346 using computing resources of the server computer 342 or component thereof and stores snapshot data 346 in one or more storage devices of the on-demand storage service 308. The separate process may be a process or other executable code supported by the virtualization layer 344. The on-demand storage service 308 may be a group of computer systems configured to store snapshot data 346 that is accessible to one or more other computer systems, such as the block-level forensics service 310. In this way, snapshot data 346 is maintained by the on-demand storage service 308 may be accessed by the block-level forensics service 310 and/or customers. The on-demand storage service 308 may be a data warehouse or a non-queryable data storage system. A data storage system and/or data storage device is queryable if the data storage system and/or data storage device enable requestors to submit data queries and receive response to the submitted data queries. For example, the on-demand storage service 308 may include a database, such as an Structured Query Language (SQL) database, which enables the customer, the block-level forensics service, or other services of the computing resource service provider 304 to query the on-demand storage service 308 for information contained in or associated with the snapshot data 346 and stored by the on-demand storage service 308. In another example, the on-demand storage service 308 may be non-queryable in so much as the on-demand storage service 308 stores snapshot data 346 (e.g., volume images) as data objects which are obtainable by a data object identifier, such as a file name or key, but does not enable queries on information contained in the on-demand storage service 308.

The on-demand data storage service 308 may be a collection of computing resources configured to synchronously process requests to store and/or access data. The on-demand data storage service 312 may operate using computing resources (e.g., databases) that enable the on-demand data storage service 312 to locate and retrieve data quickly, to allow data to be provided in response to requests for the data. For example, the on-demand data storage service 312 may maintain stored data in a manner such that, when a request for a data object is retrieved, the data object can be provided (or streaming of the data object can be initiated) in a response to the request. As noted, data stored in the on-demand data storage service 312 may be organized into data objects. The data objects may have arbitrary sizes except, perhaps, for certain constraints on size. Thus, the on-demand data storage service 312 may store numerous data objects of varying sizes. The on-demand data storage service 312 may operate as a key value store that associates data objects with identifiers of the data objects that may be used by the customer to retrieve or perform other operations in connection with the data objects stored by the on-demand data storage service 312.

The block-level forensics service 310 may be responsible for processing snapshot data 346 obtained from the on-demand storage service 302. For example, the block-level forensics service 310 may obtain snapshot data 346 from the on-demand storage service 308 and may process the snapshot data 346 to generate disk forensics information. The disk forensics information may then be stored such that the disk forensics information is accessible to the customer or other services of the computing resource service provider 304 to be used to detect and mitigate threats.

Figure 4:
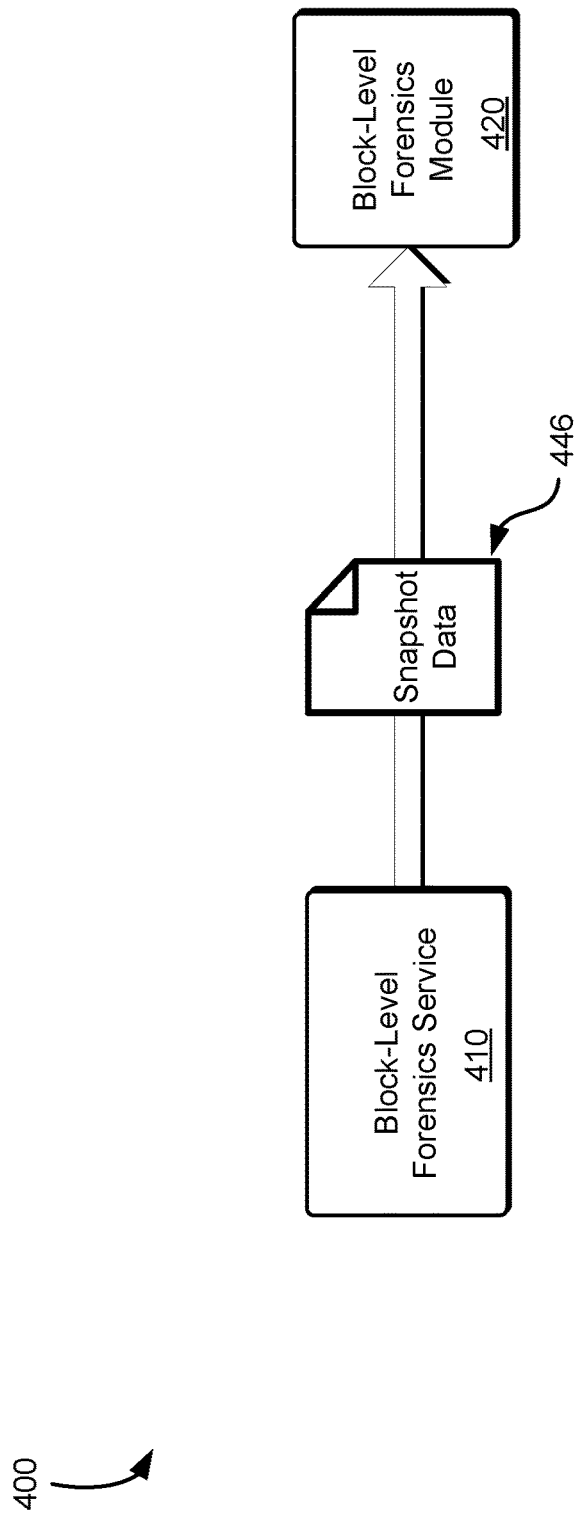
FIG. 4 illustrates an example environment in which a block-level forensics service may analyze a volume in accordance with an embodiment.

FIG. 4 illustrates an environment 400 in which a block-level forensics service 410 of a computing resource service provider may perform forensics analysis on snapshot data 446 in accordance with at least one embodiment. The block-level forensics service 410, which may be implemented by physical hardware, is used by the computing resource service provider to perform disk forensics and similar analysis on snapshot data 446 (e.g., volume images) on behalf of customers and/or other services of the computing resource service provider. The block-level forensics service 410 may include a group of computing systems, such as the server computers described in detail below, configured to generate disk forensics information based at least in part on snapshot data 446 obtained from customers or other services of the computing resource service provider by at least performing forensic analysis of the snapshot data 446.

The physical hardware may include a server computer. The server computer may be any device or equipment configured to execute instructions for performing data computation, manipulation, or storage tasks, such as a computer or a server. A server computer may be equipped with any needed processing capability including one or more processors, such as a central processing unit (CPU), a graphics processing unit (GPU) or a digital signal processor (DSP), memory, including static and dynamic memory, buses and input and output ports that are compliant with any handshaking, communications, or data transfer protocol. The physical hardware may also include storage devices, such as block-level storage devices, storage disks and tapes, networking equipment, and the like. In addition, the server computers may contain specialized hardware for performing disk forensics such as high capacity hard disk drives and security dongles for performing forensic analysis.

A virtualization layer may include a bare metal hypervisor or a hosted hypervisor. The virtualization layer executing on the service computer enables the physical hardware to be used to provide computational resources upon which one or more block-level forensics modules 420 or other computing resources may operate. For example, the virtualization layer enables a particular block-level forensics module 420 to access physical hardware on the server computer through virtual device drivers or other executable code on the block-level forensics module 420. The virtualization layer may include a hypervisor or virtualization software and/or hardware. The virtualization layer may also include an instance of an operating system dedicated to administering the block-level forensics module 420 or other computing resource executing on the server computer. Each virtualization layer may include its own networking software stack, responsible for communication with other virtualization layers and, at least in some embodiments, also responsible for implementing network connectivity between the block-level forensics module 420 or other computing resources executing on the server computer and block-level forensics module 420 or computing resources executing on other server computers.

Furthermore, the server computer may host multiple virtualization layers of the same or different types on the same server computer as well as block-level forensics module 420 of the same or different types. For example, a server computer system may host a first block-level forensics module 420 instantiated from a first volume image and may host a second block-level forensics module 420 instantiated from a second volume image. The virtualization layer may be any device, software, or firmware used for providing a virtual computing platform and/or virtualized computing resources for the block-level forensics module 420 and/or component thereof. The virtual computing platform may include various virtual computer components, such as one or more virtual CPUs, virtual memory, virtual disk storage, and the like. The block-level forensics module 420 may be provided to the customers or other service of the computing resource service provider and the customers may utilize the block-level forensics module 420 or components thereof to perform forensic analysis.

As illustrated in FIG. 4, the block-level forensics module 420 may include a storage device and a block-level forensics module 420. In addition, the block-level forensics module 420 may be operated by or part of the block-level forensics service 410. The storage device may include one or more block-level storage devices (and/or virtualizations thereof). The block-level storage devices may, for instance, be operationally attached to block-level forensics module 420 and provided by a block-level data storage service which provides the storage device as a logical unit (e.g., virtual drives). The block-level storage device may enable the persistent storage of data used/generated by the block-level forensics module 420. In various embodiments, the storage device is a virtual device supported by the virtualization layer which enables the block-level forensics module 420 to access a physical block-level storage device of the server computers through the storage device (e.g., virtual device). The block-level forensics module 420 may include software or other executable code loaded into memory of the block-level forensics module 420 that, when executed by one or more processors of the block-level forensics module 420, cause the block-level forensics module 420 to perform analysis of at least a portion of snapshot data 446 loaded into memory of the storage device.

Commands and other information may be included in an application program interface (API) call from the block-level forensics service 410 to the virtualization layer. The block-level forensics service 410 may obtain snapshot data 446 as described above in connection with FIG. 3. In response to a command to analyze particular snapshot data 446, the block-level forensics service 410 may transmit an API call to the virtualization layer, causing the virtualization layer to load the snapshot data 446 into the storage device. In yet other embodiments, the block-level forensics service 410 may perform analysis of snapshot data without a corresponding command from a customer. In addition, the block-level forensics service 410 may be configured to communicate directly with the block-level forensics module 420 and may not transmit commands to the virtualization layer.

The command to load the snapshot data 446 into the storage device may be an API call including information corresponding to the snapshot data 446, the customer, an on-demand storage service, a location of the snapshot data 446, or other information suitable for loading the snapshot data 446 into the storage device. The block-level forensics service 410 may transmit a command to the block-level forensics module 420 to perform analysis of the snap shot data 446. The analysis may include a variety of forensic analysis techniques as described herein and configured to reconstruct the snapshot data 446, reconstruct a file system of the snapshot data 446, or determine other information associated with the snapshot data 446. The block-level forensics module 420 may be configured to return a result of the analysis of the snapshot data 446 to the block-level forensics service 410.

Figure 5:
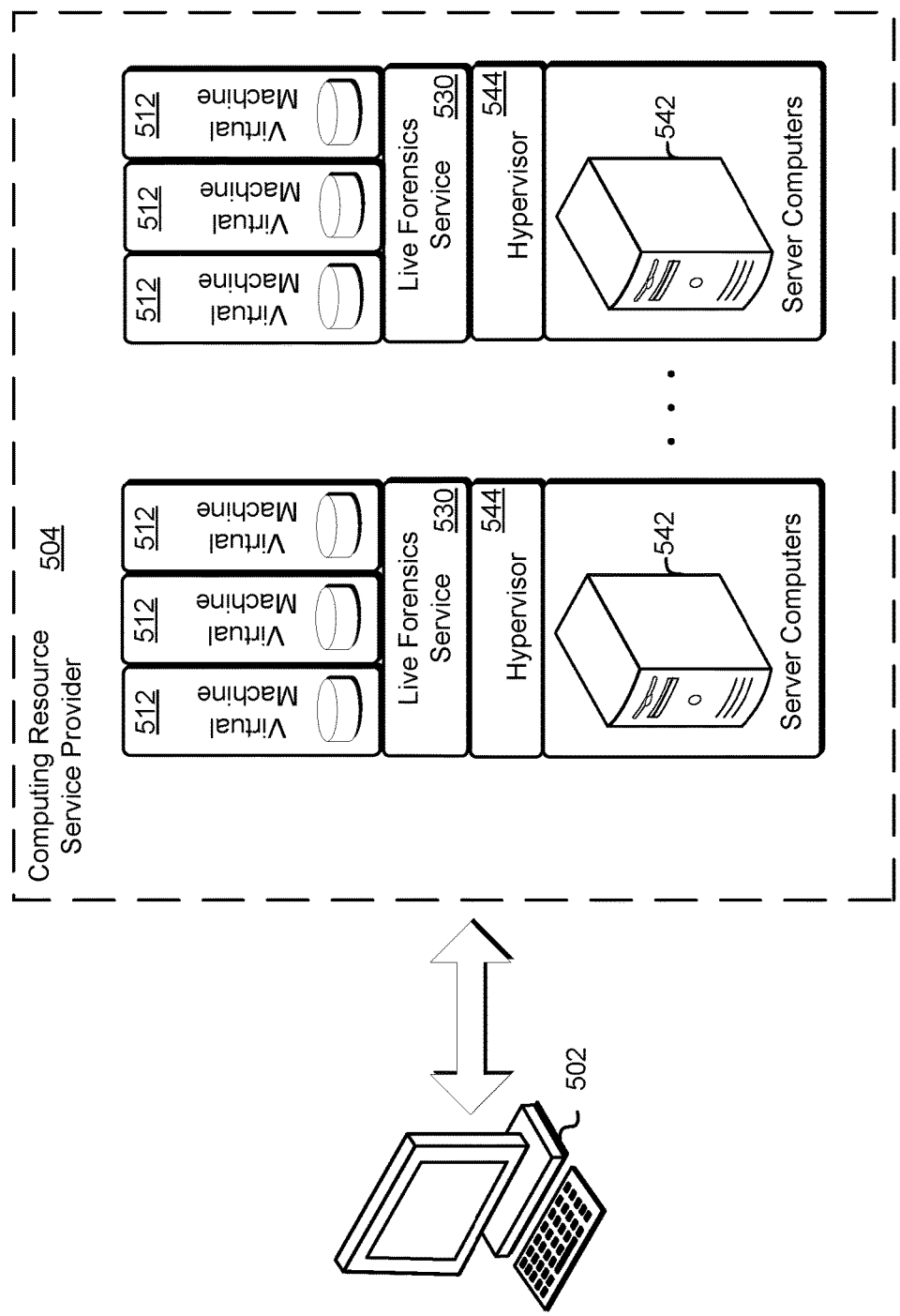
FIG. 5 illustrates an example environment in which a block-level forensics service may analyze a volume in accordance with an embodiment.

FIG. 5 illustrates a virtual computer system service executing a plurality of virtual machines 512 including logical volumes managed by a data storage service in accordance with at least one embodiment. The virtual computer system service (not illustrated in FIG. 5 for simplicity), which may be server computers 542, is used by a computing resource service provider 504 to provide computation resources for customers 502. The customers 502 may include website operators, online retailers, social network providers, cable providers, online game providers, or any entity capable of receiving automated agent traffic. The server computers 542 may include physical hosts also referred to as a host computer system. The physical hosts may be any device or equipment configured to execute instructions for performing data computation, manipulation or storage tasks, such as a computer or a server. A physical host may be equipped with any needed processing capability including one or more processors, such as a central processing unit (CPU), memory management unit (MMU), a graphics processing unit (GPU) or a digital signal processor (DSP), memory, including static and dynamic memory, buses and input and output ports that are compliant with any handshaking, communications or data transfer protocol. The server computers 542 may also include storage devices, such as storage disks and tapes, networking equipment and the like. The storage devices may be executed by network storage devices managed by a data storage service.

A virtualization layer executing on the physical host enables the server computers 542 to be used to provide computational resources upon which one or more virtual machines 512 may operate. For example, the virtualization layer may enable a virtual machine 512 to access server computers 542 on the physical host through virtual device drivers on the virtual machine 512. Furthermore, physical host may host multiple hypervisors of the same or different types on the same server computers 542. The hypervisor 544 may be any device, software, or firmware used for providing a virtual computing platform for the virtual machines 512. The virtual computing platform may include various virtual computer components, such as one or more virtual CPUs, virtual memory management units, virtual memory, and the like. The virtual machines 512 may be provided to the customers 502 of the computing resource service provider 504 and the customers 502 may run an operating system or an application on the virtual machines 512. Further, the computing resource service provider 504 may use one or more of its own virtual machines 512 for executing its applications, such as the live forensics service 530. The hypervisor 544 may expose to the virtual machines 512 a logical volume implemented by the data storage service (not shown in FIG. 5 for simplicity). Furthermore, live forensics service 530 may monitor requests received at the hypervisor 544 to interact with data contained in the logical volumes. For example, the logical volume may utilize a log-structured storage system and the live forensics service 530 monitors log-events and performs forensic analysis of log events to detect malicious activity.

As described above, the virtual machine 512 may be used for various purposes, such as to operate as servers supporting a website, to operate business applications, or, generally, to serve as computing power for the customer 502. Other applications for the virtual machine 512 may be to support database applications, electronic commerce applications, business applications, and/or other applications. The live forensics service 530 may monitor the operation of the virtual machines 512 by at least performing forensics analysis on one or more portions of the logical volumes attached to the virtual machines 512. This may include portions of the logical volume that are interacted with more frequently than the other portions of the logical volume. The live forensics service 530 may then indicate to a block-level forensics service a result of the analysis performed. For example, the live forensics service 530 may determine the most frequently accessed areas of the attached logical volumes or the most common files among the logical volumes attached to a set of virtual machines 512. The most frequently accessed areas of the attached logical volumes may include a file or portion thereof. In this manner the live forensics service 530 may monitor for malicious activity and may operate as an intrusion detection system and/or sensor.

In one embodiment, the live forensics service 530 may generate a copy of the logical volume (e.g., a volume image) and perform analysis on the copy. The live forensics service 530 may only copy portions of the logical volume that have been modified since the last analysis of the logical volume was performed. In this way the live forensics service 530 may reduce an amount of data that is copied before analysis may be performed. In yet another embodiment, the live forensic service 530 is granted read access to a point-in-time consistent version of the logical volume while the logical volume is still attached to the virtual machine 512 without the need to copy the data.

Figure 6:
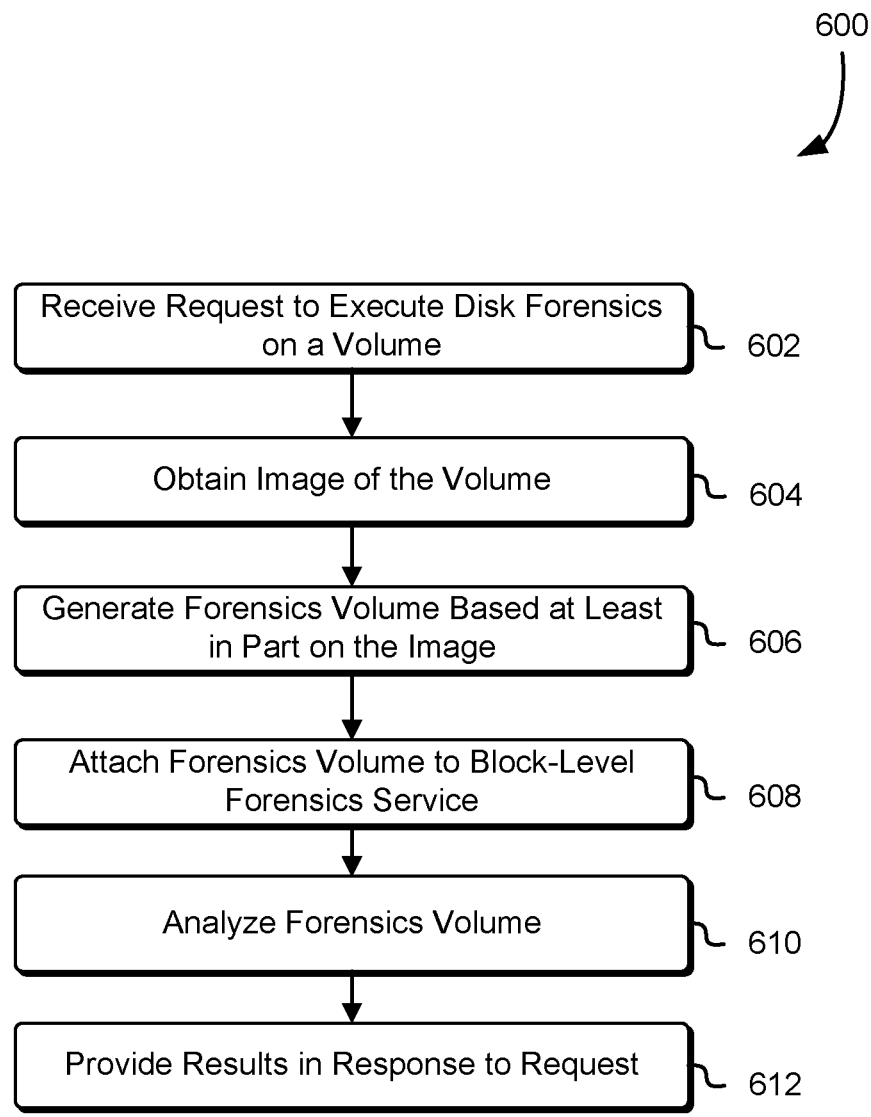
FIG. 6 shows an illustrative process which may be used to analyze a volume in accordance with an embodiment.

FIG. 6 is a block diagram illustrating an example of a process 600 for executing disk forensics on a volume in accordance with at least one embodiment. The process 600 may be performed by any suitable system such as a block-level forensics service or component thereof as described above in connection with FIGS. 1 and 3. The process 600 includes receiving a request to execute disk forensics on a volume 602. The volume may be a logical volume, as described above, and may be attached to a virtual machine or other computing resources. For example, the volume may be a boot volume utilized by a customer to instantiate instance of a webserver and execute applications of the webserver. The customer may transmit the request to perform disk forensics through a management console as described above.

The block-level forensics service may then obtain an image of the volume 604. Obtaining the image may include transmitting a request to a block-level storage device service for a point-in-time consistent snapshot (e.g., volume image) of the volume. During the generation of the image any attempts to overwrite data on the volume may be queued or otherwise stalled until a copy of the volume may be stored. The block-level forensics service may then generate a forensics volume based at least in part on the image 606. For example, the image is provided to a computer system configured to perform the forensics analysis.

The block-level forensics service may then attach the forensics volume to the computer system 608. For example, the computer system then reconstitutes the volume (e.g., convert the image back into a volume) and attaches that volume to the computer system. The volume may be attached as a read-only evidentiary attachment. The computer system may then analyze the forensics volume 610. The computer system may utilize licensed and/or open source tools or other software to perform the forensics analysis. The computer system may extract slack space from the forensics volume at various layers. The computer system may determine what type of file systems, files, software, executable code, data object, and other information is included in the forensics volume or was include in the forensics volume at a previous point in time (e.g., files that have been deleted). In addition, the computer system may include heuristics or other logic to decisions about the information obtained from the forensics volume. For example, whether the slack space contains malware or whether library files have been maliciously altered. The computer system may then provide a result of the analysis to the block-level forensics service 612.

Figure 7:
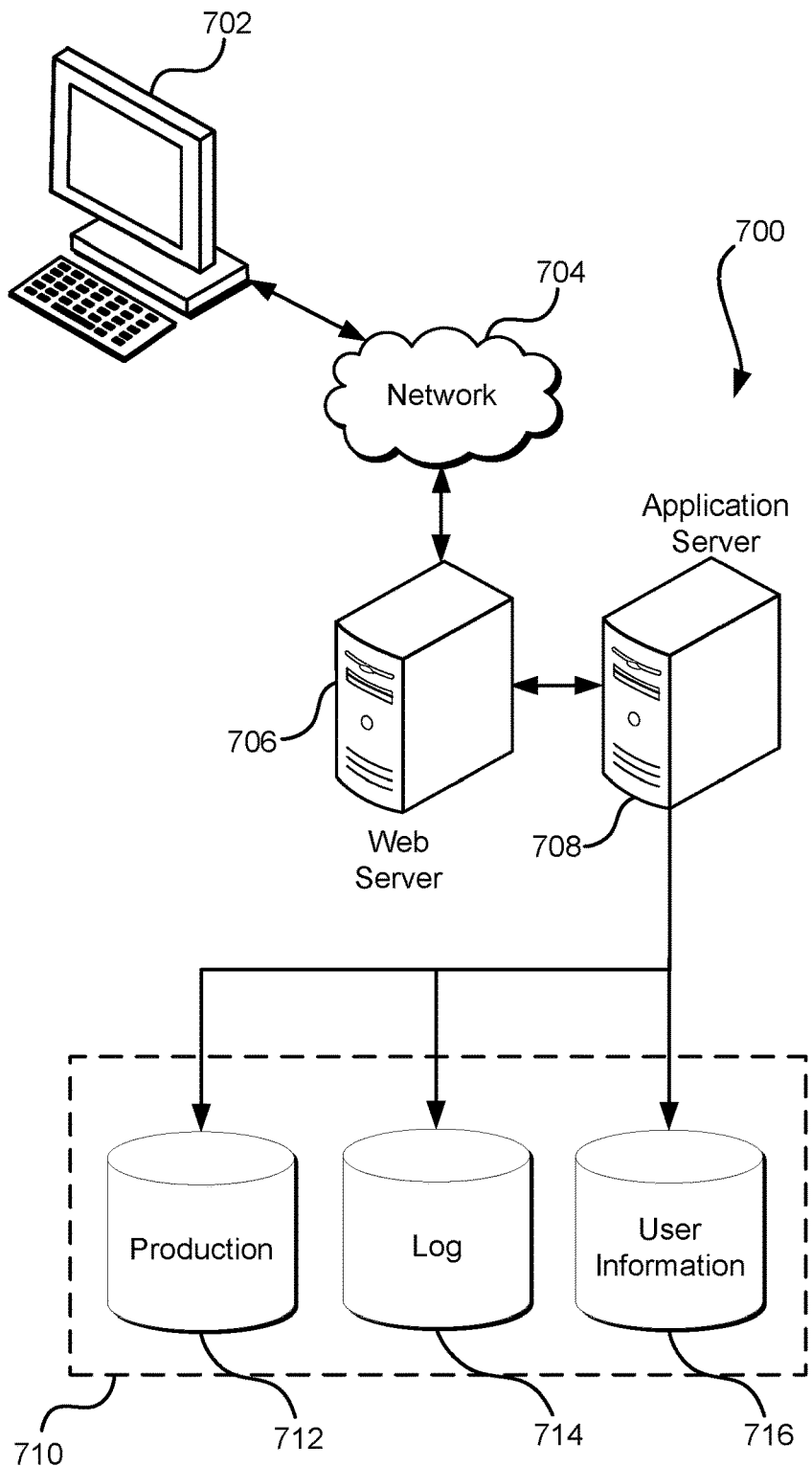
FIG. 7 illustrates an environment in which various embodiments can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages, or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 702 and the application server 708, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. The application server 708 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: $\{A\}$, $\{B\}$, $\{C\}$, $\{A, B\}$, $\{A, C\}$, $\{B, C\}$, $\{A, B, C\}$. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving a request to perform forensic analysis of a logical volume attached to a customer virtual machine instance, the logical volume associated with a customer of a computing resource service provider that implements the logical volume on hardware of the computing resource service provider;
    generating an image of the logical volume, where the image is generated by at least deferring writes to the logical volume while data contained in the logical volume is copied;
    making the image accessible to a block-level forensics service;
    causing the block-level forensics service to perform forensic analysis of the image, wherein the forensic analysis includes:
    tracking file modification frequency of one or more files included in a logical volume of another customer;
    generating a histogram of the file modification frequency of the one or more files included in the logical volume of the other customer;
    extracting timestamps of intrusion detection alert information from the one or more files included in the logical volume of the other customer; and
    correlating the histogram with intrusion detection alert information obtained from an intrusion detection system; and
    providing a result of forensics analysis of the image in response to the request.

2. The computer-implemented method of claim 1, wherein the computer-implemented method further comprises:
    loading the image into a second logical volume attached to a virtual machine, the virtual machine being programmed to obtain forensics information from logical volumes; and
    wherein causing the virtual machine to perform forensic analysis further comprises performing forensic analysis of the second logical volume.

3. The computer-implemented method of claim 2, wherein performing forensic analysis of the image further comprises detecting a set of modifications to the logical volume, where the set of modifications were performed over an interval of time, by at least comparing the image to a set of previously generated images associated with the logical volume.

4. The computer-implemented method of claim 1, wherein the computer-implemented method further comprises:
    determining a portion of the logical volume that has been modified since a last image of the logical volume was generated; and
    wherein generating the image of the logical volume further comprises generating the image based at least in part on the portion of the logical volume that has been modified since the last image of the logical volume was generated.

5. The computer-implemented method of claim 1, wherein the forensic analysis further includes determining that files exist in slack space.

6. The computer-implemented method of claim 1, wherein the forensic analysis further includes correlating the histogram with computer processes running against the image.

7. A system, comprising:
    one or more processors; and
    memory that includes instructions that, when executed by the one or more processors, cause the system to:

receive a request to perform forensics analysis of a logical volume associated with a customer, the logical volume attached to one or more virtual machines associated with the customer;

obtain access to a volume image of the logical volume associated with the customer, the volume image containing contents and structure of the logical volume;

track file modification frequency of one or more files included in a logical volume of another customer;

create a histogram based at least in part on the image, the histogram including information about the file modification frequency of the one or more files included in the logical volume of the other customer;

extract timestamps of intrusion detection alert information from the one or more files included in the logical volume of the other customer;

correlate the histogram with intrusion detection alert information obtained from an intrusion detection system; and generate, based at least in part on the histogram, a result of forensics analysis of the volume image in response to the request.

8. The system of claim 7, wherein the result of forensics analysis indicates potential malicious activity associated with the logical volume.

9. The system of claim 8, wherein the result of forensics analysis further indicates a particular volume image associated with the logical volume where the potential malicious activity occurred, the particular volume image representing a snapshot version of a particular virtual machine of the one or more virtual machines associated with the customer.

10. The system of claim 7, wherein obtaining access to the volume image of the logical volume associated with the customer further comprises obtaining read-only access to the logical volume while the customer maintains read and write access to the logical volume.

11. The system of claim 7, wherein the memory further includes instructions that, when executed by one or more processors of the system, cause the system to correlate the result of forensics analysis of the volume image with information obtained from other sources of security information.

12. The system of claim 11, wherein the information obtained from the other sources of security information further comprises network activity information associated with the logical volume.

13. The system of claim 11, wherein the information obtained from the other sources of security information further comprises application process information associated with the logical volume.

14. A non-transitory computer-readable storage medium having stored thereon executable instructions that, as a result of being executed by one or more processors of a computer system, cause the computer system to at least:

cause an image of a logical volume attached to one or more virtual machines associated with a customer to be generated, the logical volume used by the customer to instantiate one or more virtual machines utilizing computing resources of a computing resource service provider, where the computing resources are distributed across one or more service provider networks operated by the computing resource service provider;

provide access to the image to the computer system, the computer system being operated by the computing resource service provider;

track file modification frequency of one or more files included in a logical volume of another customer;

analyze the image to create a histogram of the file modification frequency of the one or more files included in the logical volume of the other customer;

extract timestamps of intrusion detection alert information from the one or more files included in the logical volume of the other customer;

correlate the histogram with intrusion detection alert information obtained from an intrusion detection system; and determine, based at least in part on the histogram, a result of forensics analysis of the image.

15. The non-transitory computer-readable storage medium of claim 14, wherein the instructions further comprise instructions that, as a result of being executed by the one or more processors, cause the computer system to, as a result of receiving a request from the customer to perform forensic analysis of the logical volume, generate the image of the logical volume.

16. The non-transitory computer-readable storage medium of claim 14, wherein the instructions further comprise instructions that, as a result of being executed by the one or more processors, cause the computer system to perform the forensics analysis as a result of the customer generating an new image corresponding to the logical volume.

17. The non-transitory computer-readable storage medium of claim 14, wherein the instructions further comprise instructions that, as a result of being executed by the one or more processors, cause the computer system to correlate the result of forensics analysis of the image with at least one other result of forensics analysis associated with at least one other customer.

18. The non-transitory computer-readable storage medium of claim 14, wherein the instructions further comprise instructions that, as a result of being executed by the one or more processors, cause the computer system to obtain, from the customer, a cryptographic key to decrypt the image and decrypt the image prior to providing the computer system with access to the image.

19. The non-transitory computer-readable storage medium of claim 18, wherein the instructions that cause the computer system to obtain the cryptographic key further include instructions that cause the computer system to obtain the cryptographic key from a hardware security module.

* * * * *